July 16, 1968  L. M. ELLIS  3,393,029
LID AND MOTOR BOARD LIFT SUPPORT
Filed May 15, 1967  2 Sheets-Sheet 1
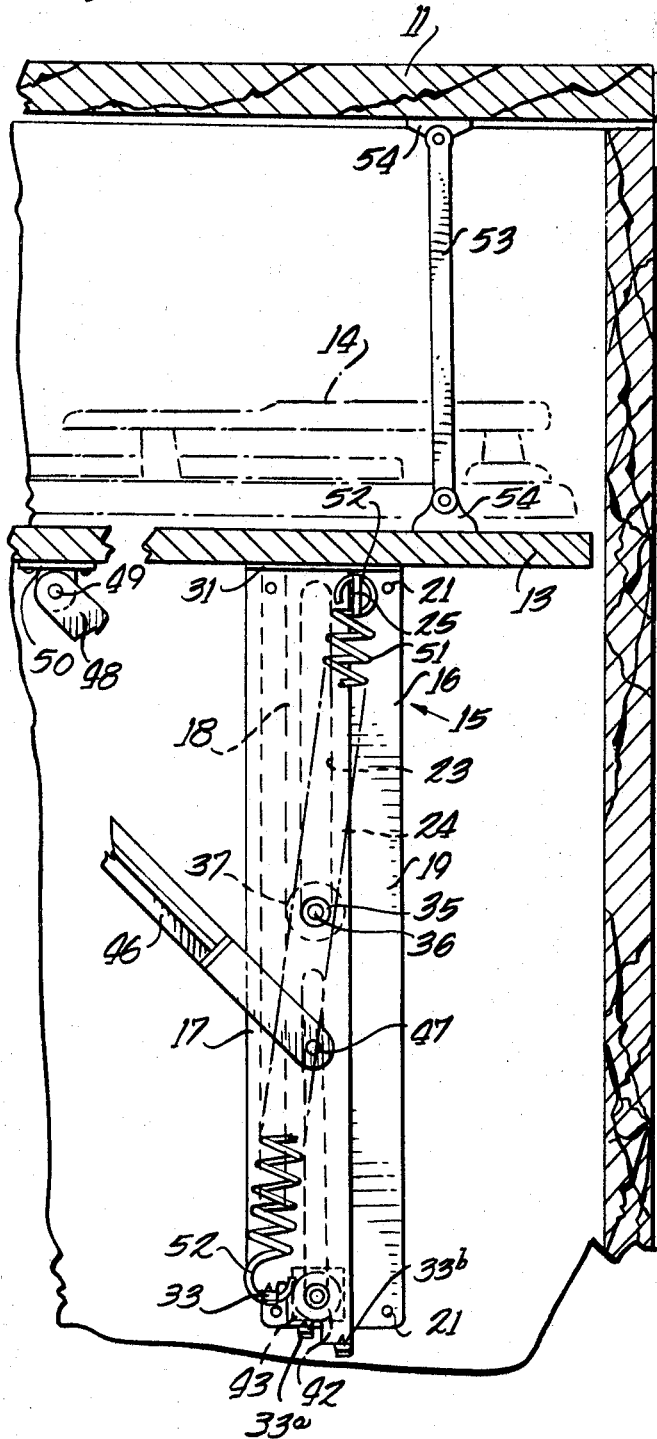
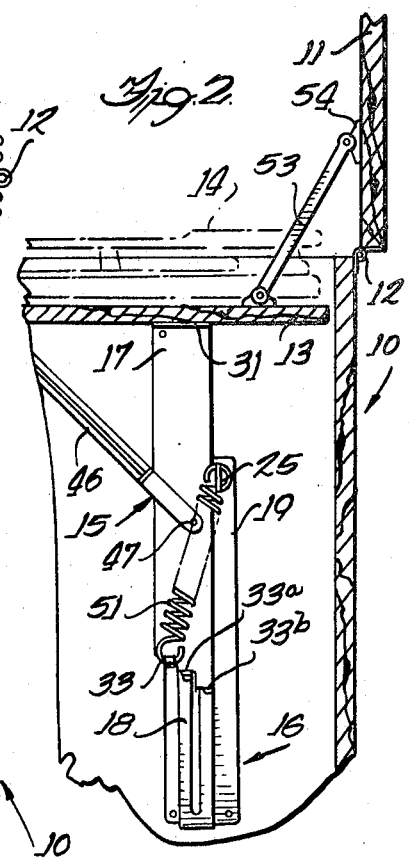
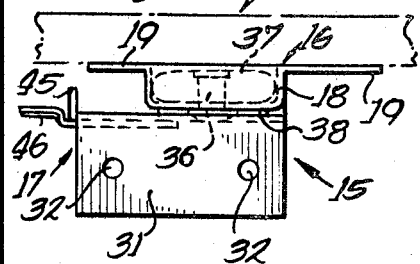
Inventor
Leslie M. Ellis
by Wilson & Geppert
Attys July 16, 1968  L. M. ELLIS  3,393,029
LID AND MOTOR BOARD LIFT SUPPORT
Filed May 15, 1967  2 Sheets-Sheet 2
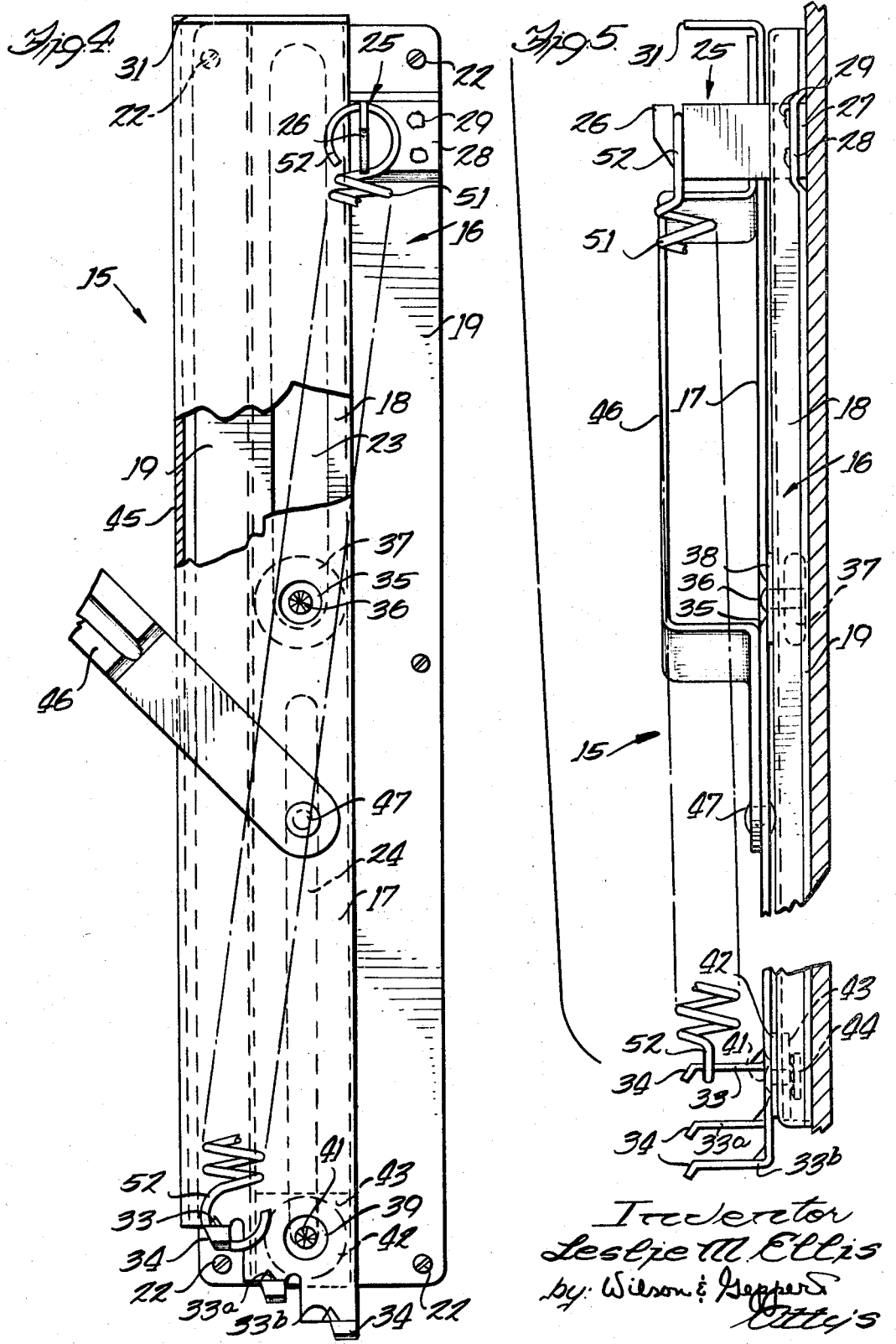

United States Patent Office 3,393,029
Patented July 16, 1968

3,393,029
LID AND MOTOR BOARD LIFT SUPPORT
Leslie M. Ellis, Capron, Ill., assignor to National Lock Co., Rockford, Ill., a corporation of Delaware
Filed May 15, 1967, Ser. No. 638,445
8 Claims. (Cl. 312—25)

ABSTRACT OF THE DISCLOSURE

A turntable support and elevating mechanism which is used in combination with a hinged lid on a cabinet for a phonograph or the like where the lid is connected to the motor board through support links and the motor board is supported in the cabinet by slotted frame members secured to the interior of the cabinet and brackets tensionally mounted for vertical movement relative to the frame members. A roller carried by each bracket moves in the slotted frame member to limit the extent of reciprocatory movement, and guide the bracket relative to the frame member.

---

The present invention relates to a lid and motor board lift support for a phonograph cabinet and more particularly a supporting device for a motor board and turntable in a cabinet for a phonograph and actuated by the hinged lid for the cabinet.

The present invention comprehends a vertically reciprocable motor board in a cabinet having a hinged lid with a linkage connecting the lid and motor board. A supporting mechanism for the motor board includes a stationary frame member secured to the cabinet and having a raised portion forming a pocket and a pair of longitudinally extending and spaced elongated slots. A bracket is secured to the lower surface of the motor board and carries a rivet projecting through the upper slot for a roller in the pocket and a rivet projecting through a lower slot for a washer in the pocket, and an expansion spring having one end connected to the upper end of the frame member and the lower end connected to the lower end of the bracket.

Among the objects of the present invention is the provision of a novel supporting device for a motor board adapted for vertical movement in a cabinet for a phonograph or similar device with the vertical movement of the motor board being actuated by opening or closing movement of a pivoted top-opening lid for the cabinet. The supporting device provides for limited vertical and reciprocatory movement of the motor board in the cabinet through a two-part support on each side of the cabinet, the lid being connected to the motor board through a pair of lid supports or links.

Another object of the present invention is the provision of a novel supporting device for a motor board and lid of a cabinet where upon release of a latch for the lid of the cabinet, the lid pops open to a limited extent due to resilient means connecting the two parts of the supporting device. The motor board is connected to the lid by the lid supports or links, with the linkage being positioned so as to provide the proper leverage to allow for the lid to pop or extend partially open. As the lid is moved from closed to open position, the linkage causes the motor board to move to an elevated position for ease of access to the controls, tone arm and turntable of the phonograph.

A further object of the present invention is the provision of a novel supporting device for the motor board to allow limited reciprocation thereof including an elongated frame or stationary member secured to the interior surface of the wall of the cabinet and an elongated bracket which is secured to the motor board. The bracket moves along the frame guided by suitable means, such as a spaced wheel and washers, secured to the bracket and moving in the frame. A spring secured between the bracket and the frame provides a resilient supporting means for the motor board.

Further objects are to provide a construction of maximum simplicity, efficiency, economy and ease of assembly and operation and such further objects, advantages and capabilities as will later more fully appear and are inherently possessed thereby.

In the drawings:
FIGURE 1 is a partial vertical cross sectional view of a phonograph cabinet having a hinged lid and the reciprocable motor board and lift support; the lid being shown in closed position.

FIG. 2 is a partial vertical cross sectional view similar to FIG. 1, but with the lid in open position and the motor board in raised position.

FIG. 3 is an enlarged top plan view of the support assembly for the motor board.

FIG. 4 is an enlarged front elevational view of the support assembly.

FIG. 5 is an enlarged side elevational view of the support assembly taken from the right-hand side of FIG. 4.

Referring more particularly to the disclosure in the drawings wherein is shown an illustrative embodiment of the present invention, FIGS. 1 and 2 disclose a cabinet 10 for a phonograph or similar device, the cabinet having a top-opening lid 11 hinged or pivoted at the rear edge of the cabinet by the hinges 12 and a motor board 13 supporting a phonograph turntable or changer and the tone arm therefor shown in dotted outline at 14 in FIGS. 1 and 2. For ease of operation, the motor board 13 is mounted for vertical or reciprocatory movement within the cabinet 10 by a pair of supporting devices 15, one at each side of the cabinet with one being shown in FIG. 1, so that the motor board is lowered into the cabinet 10 (FIG. 1) when the lid is closed and is raised to position of ready access when the lid is opened to the position of FIG. 2.

A supporting device 15 is mounted on the interior surface of the cabinet 10 at each end or side thereof, and each supporting device 15 includes a frame or stationary member 16 and a bracket 17. The frame member 16 is an elongated member with a central raised portion 18 forming an elongated pocket or enclosure and defining a pair of opposed mounting flanges 19 having openings 21 for suitable securing means, such as screws 22. The raised portion 18 has an upper elongated slot 23 extending for substantially one-half the length of the frame member 16 and a lower narrow elongated slot 24 of substantially the same length as the wider upper slot 23. A spring bracket 25 having a notched ear 26 is secured to the frame through a flange or support ear 27 that extends through a slot (FIG. 5) and underlies a raised portion 28 of the mounting flange 19. The bracket 25 is secured to the frame 16 as by riveting or spot welding 29.

The bracket 17 is an elongated generally rectangular member having an inturned mounting flange 31 at the upper end thereof with openings 32 for suitable securing means to secure the bracket to the underside of the motor board 13. At the opposite end of the bracket, three spaced inturned ears 33, 33ᵃ and 33ᵇ are formed perpendicular to the bracket, with each ear having an outer downturned end 34. An opening in a depression 35 substantially intermediate the ends of the bracket 17 is provided for a rivet 36 extending therethrough and through the upper slot 23 in the frame 16 to support a roller 37 within and moving in the elongated pocket formed by the raised portion 18 thereof. A washer 38 (FIG. 3), formed of suitable material such as nylon to reduce friction, is mounted to encompass the depression 35 between the bracket 17 and the frame 16.

A second opening in a depression 39 is positioned adjacent the lower end of the bracket 17 and receives a second rivet 41 extending through the opening in the narrow slot 24 in the frame and carrying a washer 42 encompassing the depression 39 between the bracket 17 and frame 16 and a square washer 43 within the pocket formed by the raised portion 18. A shakeproof spring washer 44 is secured to the inner end of the rivet 41. The bracket 17 also includes a downturned flange 45 extending along the one edge (FIGS. 3 and 4), and a brace 46 secured to the bracket 17 by suitable securing means, such as rivets 47. This supporting brace 46 extends upward at an angle to the bracket 17 and terminates in an upper end 48 having an opening for suitable securing means 49 to secure the brace to a bracket 50 secured to the underside of the motor board 13.

A coil spring 51 having a loop 52 at each end has one loop 52 connected to the notched ear 26 of the spring bracket 25 and the opposite loop 52 connected to one of the three spaced ears 33, 33ᵃ or 33ᵇ depending on the tension desired in the spring; the spring being shown connected to the ear 33. To connect the lid and motor board, a lid support or link 53 is positioned adjacent each of the opposite sides of the lid 11 and motor board 13, with the link 53 pivotally mounted at each end to a mounting bracket 54; one mounting bracket 54 being secured to the lid 11 and the mounting bracket 54 at the opposite end of the link 53 being secured to the mounting board 13.

As shown in FIG. 2, the lid 11 is open and the motor board 13 is in its raised position. When the lid is closed (FIG. 1), the links 53 act to urge the motor board 13 downward against the force of the spring 51. Downward movement of the motor board causes downward movement of the bracket 17 relative to the frame 16 with the rivet 36 and roller 37 and the rivet 41 and washers 42, 43 cooperating with the raised portion 18 and upper and lower slots 23 and 24, respectively, in the frame 16 to insure vertical movement of the connected bracket 17 and the motor board 13. Reciprocable movement of the bracket 17 is limited by the length of the slots 23 and 24 and, as the bracket moves downward relative to the frame 16, the spring 51 is distended and placed under increasing tension until the lid 11 is closed and latched (FIG. 1).

When the latch for the lid 11 is released, the tension in the spring 51 causes the motor board 13 and lid 11 to pop up to a partially open position for the lid. The links 53 and mounting brackets 54 are so positioned on the lid 11 and motor board 13 as to provide the proper leverage so that the lid will partially open on release of the latch, and the lid can be easily grasped for further elevated movement. The linkage between the lid 11 and the motor board 13 and its location and the spring and its position on one of the ears 33, 33ᵃ or 33ᵇ can be varied so that the lid does not pop up, but must be moved from the fully closed position. The weight of the motor board and phonograph turntable obviously will counterbalance to some extent the tension exerted by the spring 51.

While the supporting means has been shown and described as being advantageously applicable to a motor board in a top-opening phonograph cabinet, it is not my desire or intent to unnecessarily limit the scope or the utility of the improved features by virtue of this illustrative embodiment.

Having thus disclosed my invention, I claim:

1. A lid and motor board lift support for a phonograph or similar article mounted in a cabinet having a pivotally mounted lid and a vertically movable motor board therein, comprising a linkage connecting the lid and motor board for simultaneous movement thereof, and supporting mechanism for the motor board including an elongated stationary frame member secured within the cabinet and having a central longitudinally extending raised portion forming a pocket between the raised portion and the cabinet and oppositely disposed mounting flanges, said central raised portion having a pair of longitudinally extending and spaced elongated slots therein opening into the pocket, an elongated bracket having a mounting flange at its upper end secured to said motor board, said bracket mounted for vertical movement relative to the stationary frame member and limited by said slots, a spring bracket secured to one of said mounting flanges adjacent the upper end of the frame member, and a spring secured at one end to said spring bracket and at the opposite end to the lower end of the elongated bracket, said spring being under normal tension when said elongated bracket is in its upper position relative to said frame member, and when said elongated bracket is in its lower position exerting tension on said spring, the spring tension acting to cause the cabinet lid to move to a partially open position.

2. A lid and motor board lift support for a phonograph or similar article mounted in a cabinet having a pivotally mounted lid and a vertically movable motor board therein, comprising a linkage connecting the lid and the motor board for simultaneous movement, and supporting mechanism for the motor board including a stationary frame member secured within the cabinet and having a central elongated raised portion forming a pocket and oppositely disposed mounting flanges, said raised portion having a pair of axially aligned and spaced elongated slots communicating with the pocket, a bracket secured to the motor board and mounted for limited vertical movement relative to the frame member, said bracket carrying a pair of vertically spaced rivets extending into the spaced slots in the frame, the upper rivet carrying a roller mounted and vertically movable within said pocket and the lower rivet carrying a washer in said pocket, said rivets, roller and washer directing vertical movement of the bracket and motor board and the slots limiting the extent of such vertical movement, a spring bracket secured to one mounting flange adjacent the upper end thereof, and a spring secured at one end to said spring bracket and at the opposite end to said first mentioned bracket, said spring being under normal tension when the bracket is in its upper position relative to said frame members.

3. A lid and motor board lift support as set forth in claim 2, including a friction washer carried by each rivet between the bracket and the raised portion.

4. A lid and motor board lift support as set forth in claim 2, including a plurality of spaced ears at the lower end of the bracket, each ear having a narrow downturned outer end to receive and affix thereto the lower end of the spring in the desired adjusted tensioning position.

5. A lid and motor board lift support as set forth in claim 4, in which the opposite end of the spring is connected to the spring bracket on the frame, said bracket when in its lower position exerting tension on the spring with the spring tension acting to cause the lid of the cabinet to move to a partially open position.

6. A lid and motor board lift support as set forth in claim 2, in which said washer carried by the lower rivet is generally rectangular and conformably received in said pocket.

7. A lid and motor board lift support as set forth in claim 2, in which said linkage includes a pair of links, each link pivotally mounted at each end on mounting brackets secured to the lid and the motor board.

8. A lid and motor board lift support as set forth in claim 2, including a mounting flange at the upper end of said bracket, and an angularly positioned mounting brace secured at one end to said bracket, the opposite end of said brace and said mounting flange both being secured to said motor board.

References Cited

UNITED STATES PATENTS

| | | | |
|---|---|---|---|
| 540,823 | 6/1895 | Wass et al. | 312—25 |
| 576,653 | 2/1897 | Bowlby | 312—272.5 |
| 1,229,620 | 6/1917 | Klimo | 312—25 |
| 1,457,744 | 6/1923 | Newman et al. | 312—25 |
| 2,195,393 | 4/1940 | Altorfer | 312—25 |
| 2,452,208 | 10/1948 | Reger | 267—1 |
| 3,310,354 | 3/1967 | Patterson | 312—272.5 XR |

BOBBY R. GAY, *Primary Examiner.*

J. L. KOHNEN, *Assistant Examiner.*